Patented July 12, 1949

2,476,015

UNITED STATES PATENT OFFICE 2,476,015

METHOD FOR CONSOLIDATION OF SANDS

Gilbert G. Wrightsman, Houston, Tex., assignor, by mesne assignments, to Standard Oil Development Company, Elizabeth, N. J., a corporation of Delaware No Drawing. Application October 28, 1946, Serial No. 706,103

6 Claims. (Cl. 61—36)

The present invention is directed to a method for consolidating water-wetted incompetent formations.

In the production of fluid, such as petroleum, from an underground reservoir, it is conventional in the art to project boreholes from the surface of the earth into the producing formation to form wells, such as oil wells, by means of which fluid may be withdrawn from the reservoir.

Numerous sand members of various formations from which oil is produced are unconsolidated and are so incompetent that large quantities of the sand grains are produced from the wells along with the fluids. Production of fluids from these formations is hazardous in that the well connections may be eroded through to allow the well to blow out and flow unrestricted. Also, sand grains often accumulate in the well bore, due to the fact that the fluid velocity at prorated flow rates is too low to remove the sand. This sand accumulation in the well bore causes the well to cease to produce fluids. Then production must be revived at great cost by cleaning the sand from the well bore. The need for frequent rejuvenation of wells may cause premature abandonment while recoverable oil still would be obtainable if it were possible to prevent the excessive sand production. In addition, removal of sand which accumulates in the surface equipment, such as flow lines, separators, and storage tanks, adds greatly to the cost of oil production.

It is an object of the present invention to devise a method for suppressing or eliminating the production of sand from wells completed in incompetent fluid-producing formations.

In patent application Serial No. 662,408, filed April 15, 1946, is disclosed a method for consolidating fluid-producing formations. In the aforesaid application it is proposed to consolidate an incompetent formation by depositing therein a homogeneous mixture comprising an aqueous solution of water-soluble aldehyde, a low molecular weight hydroxy aryl compound and an acidic catalytic agent, such as stannous chloride, which is capable of catalyzing the reaction between the aldehyde and the hydroxy aryl compound. When the aforesaid homogeneous mixture reacts and a phase separation takes place a tough resinous reaction product and a water-like liquid form the two phases. In the aforesaid application Serial No. 662,408 the homogeneous mixture is retained within the formation until the resinous reaction product forms therein and consolidates the formation. The watery material which is present when the reaction is completed comprises water and unreacted aldehyde and occupies space between the grains of the formation; this watery material may subsequently be removed, thereby allowing formation fluid to pass through the consolidated formation. The acidic catalytic agent in the mixture is capable not only of catalyzing the reaction but, in addition, causes preferential wetting of water-wet formations by the resinous reaction product. In the aforesaid application it is further disclosed that the treatment of a water-wet formation by an acid reacting compound, such as stannous chloride, capable of reacting with a part of the natural solid compound of formation prior to the introduction of the homogeneous fluid mixture into the formation, often desirably increases the effectiveness of the consolidation.

The present application is directed to an improved method for consolidating formations over that disclosed in patent application Serial No. 662,408, aforesaid.

In accordance with the present invention, incompetent water-wet formations are consolidated by injecting into the formation in sequence a portion of a homogeneous resin-forming mixture comprising a water solution of water-soluble aldehyde, low molecular weight hydroxy aryl compound, and acid reacting catalytic agent, said mixture being capable of reacting within the formation whereby resinous product and a watery liquid are present in the formation. Each portion of said homogeneous resin-forming material introduced into the formation is retained quiescent in the formation until resinous reaction product is formed.

The employment of a plurality of stages of treatment consolidates the formation while retaining the porosity thereof. It is a substantial advantage in the practice of the present invention that a formation consolidated by a plurality of treatments has a substantially greater hardness than obtained by a single stage treatment even though the same amount of material is deposited in a given volume of formation with the single stage treatment as with the multiple stage treatment.

When forming the compositions employed for treating formations in accordance with the present invention, the homogeneous mixture of a low molecular weight hydroxy aryl compound is admixed with a molecular excess of an aqueous solution of a water soluble aldehyde and agent capable of catalyzing reaction between the aldehyde and the hydroxy aryl compound to form a resinous reaction product, capable of causing preferential wetting of water-wet formations by the resinous reaction product and having the additional characteristic of reacting with a part of the solid natural components of the formation. It is preferred to employ a low concentration of stannous chloride or stannous chloride admixed with a mineral acid as the catalyst capable of rendering the formation preferentially wettable by the resinous reaction product. In forming the mixture, it is preferred to employ the catalytic agent in an amount within the range of 0.25% to 10% by weight of the composition to be introduced into the formation. When stannous chloride in admixture with mineral acid is employed, it is preferred that the weight ratio of the stannous chloride to mineral acid be in the range of from 1 to 1 to about 100 to 1. The ratio of the water soluble aldehyde to hydroxy aryl compound present in the mixture to be employed is a function of the permeability and porosity of the formation to be consolidated, as well as the amount of consolidation desired. In general, the range of water soluble aldehyde to hydroxy aryl compound ratios may be varied from 1:1 to about 9:1 parts by weight which correspond to mole ratios of 1.4:1 to about 13:1.

The practice of the present invention will now be illustrated by the following example:

*Example*

A well completed in an oil producing unconsolidated formation with an original potential of 384 barrels of oil per day through a $\frac{13}{16}$ inch choke at 1275 pounds per square inch tubing pressure had produced sand in such quantities along with the oil that accumulation of sand in the well bore had caused the well to cease to produce. Approximately 22 feet of the unconsolidated producing formation was exposed. Into this formation was introduced a first portion of a reactive resin solution consisting of 9 barrels of mixture prepared from 2050 pounds of formalin, 700 pounds of phenol, 300 pounds of cresol, 1.5 barrels of water and 4% by weight of stannous chloride. The mixture was displaced from the well bore into the unconsolidated formation and was maintained undisturbed therein for 24 hours to allow it to react to deposit resinous reaction product. After the first portion had been allowed to stand undisturbed for 24 hours, a second portion of reaction mixture which corresponded exactly to the first portion was introduced into the formation with the conditions of introduction corresponding exactly to the conditions used when introducing the first portion. After the second portion of mixture had been forced into the formation, the well was shut in and the mixture allowed to remain undisturbed for 48 hours in order to form resinous reaction product. Subsequently, the well was swabbed and production of oil from this well resumed. When the well was brought into production after the consolidation treatment, it was able to produce 430 barrels of oil per day through a $\frac{13}{16}$ inch choke at 1250 pounds per square inch tubing pressure; there was no sand produced at the surface with the fluid and it was found that no sand accumulated in the well bore.

The present invention embodies several advantages and improvements over the methods heretofore practiced. Some of these advantages are as follows: The sands are consolidated to a degree far harder than by previous methods employed; the treatment is applied readily inasmuch as only one solution is injected into the formation for each of the multiple treatments; a more uniform distribution of the reactive resin solution in the sand being treated is obtained; and after the consolidation treatment not even a small amount of sand is produced when flow is initiated, as has been usual in the prior methods practiced for consolidating formations.

While I have given specific examples illustrating the practice of the present invention, it will be obvious to a workman skilled in the art that various changes may be made without departing from the scope of the invention.

Having fully described and illustrated the practice of the present invention, what I desire to claim as new and useful and to secure by Letters Patent is:

1. A method for consolidating a water-wet permeable formation without rendering the formation impermeable which comprises the steps of introducing into said formation a first portion of a homogeneous fluid mixture comprising a low molecular weight hydroxy aryl compound having less than three carbon atoms in alkyl side chains, a molecular excess of a water-soluble aldehyde over that reactable with said hydroxy aryl compound, water, and a minor quantity of an acidic catalyst for the reaction between said hydroxy aryl compound and said aldehyde, retaining said first portion of mixture in said formation until oil-insoluble and water-insoluble solid reaction product has been deposited therein, subsequently introducing a second portion of said mixture into at least a part of the formation in which resinous reaction product was deposited by the first portion, and retaining said second portion of the mixture therein until it forms resinous reaction product.

2. A method in accordance with claim 1 in which said agent comprises stannous chloride.

3. A method in accordance with claim 1 in which said agent comprises stannous chloride and an acid.

4. A method in accordance with claim 1 in which said agent comprises stannous chloride and a mineral acid and the weight ratio of said stannous chloride to said mineral acid is within the range of from 1 to 1 to 100 to 1.

5. A method in accordance with claim 1 in which said agent comprises from 0.25% to 10% by weight of said homogeneous fluid mixture and comprises stannous chloride and a mineral acid in a weight ratio within the range of 1 to 1 to 100 to 1.

6. A method for consolidating a water-wet permeable formation without rendering the formation impermeable which comprises the steps of introducing into the formation a first portion of a homogeneous fluid mixture comprising a low molecular weight hydroxy aryl compound having less than three carbon atoms in alkyl side chains, a molecular excess of a water-soluble aldehyde over that reactable with said hydroxy aryl compound, water, and a minor quantity of an acidic catalyst for reaction between said hydroxy aryl compound and said aldehyde, retaining said first portion of mixture in said formation until oil-insoluble and water-insoluble solid reaction product and a water-like liquid have been deposited therein, subsequently introducing at least a successive additional portion of said mixture into at least a part of the formation in which resinous reaction product was deposited by the first portion, retaining each successive portion of the mixture therein until additional resinous reaction product and water-like liquid is formed, and removing water-like liquid from the formation to render the formation permeable.

GILBERT G. WRIGHTSMAN.

No references cited.